(12) United States Patent
Okamura (10) Patent No.: US 10,956,729 B2
(45) Date of Patent: Mar. 23, 2021

(54) DATA PROCESSING APPARATUS AND METHOD, AND NON-TRANSITORY COMPUTER READABLE MEDIUM

(71) Applicant: TOSHIBA TEC KABUSHIKI KAISHA, Tokyo (JP)

(72) Inventor: Atsushi Okamura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 16/035,371

(22) Filed: Jul. 13, 2018

(65) Prior Publication Data

US 2019/0026549 A1 Jan. 24, 2019

(30) Foreign Application Priority Data

Jul. 20, 2017 (JP) .............................. JP2017-140645

(51) Int. Cl.
*G06K 9/00* (2006.01)
*G06K 7/14* (2006.01)
*G06Q 20/20* (2012.01)

(52) U.S. Cl.
CPC ....... *G06K 9/00449* (2013.01); *G06K 7/1413* (2013.01); *G06K 9/00469* (2013.01); *G06Q 20/208* (2013.01)

(58) Field of Classification Search
CPC ............. G06K 9/00449; G06K 7/1413; G06K 9/00469; G06K 9/325; G06Q 20/208; G07G 1/0045
See application file for complete search history.

(56) References Cited

U.S. PATENT DOCUMENTS

| 10,217,020 B1* | 2/2019 | Rivard ..................... G06K 9/72 |
| 2001/0021261 A1* | 9/2001 | Koga ................. G06K 9/00469 382/101 |
| 2002/0065728 A1 | 5/2002 | Ogasawara |

(Continued)

FOREIGN PATENT DOCUMENTS

| CN | 102339504 A | 2/2012 |
| CN | 102663379 A | 9/2012 |

(Continued)

OTHER PUBLICATIONS

Extended European Search Report dated Dec. 13, 2018 in corresponding European Patent Application No. 18184471.3, 10 pages.

(Continued)

*Primary Examiner* — Ming Y Hon
(74) *Attorney, Agent, or Firm* — Kim & Stewart LLP (57) ABSTRACT

In accordance with an embodiment, a data processing apparatus includes a memory configured to store a determination table, a camera configured to image a commodity package, and a processor. The processor is configured to extract an area having a predetermined shape from the imaged commodity package, recognize characters in the extracted area; determine whether the recognized characters meet a criterion described in the determination table, and output the recognized characters to a display or a printer connected to the data processing apparatus when the recognized characters meet the criterion.

20 Claims, 8 Drawing Sheets

(56) References Cited

U.S. PATENT DOCUMENTS

| | | | |
|---|---|---|---|
| 2002/0074405 A1* | 6/2002 | Hadano | G06K 7/10851 235/462.08 |
| 2004/0238637 A1* | 12/2004 | Russell | G06K 7/10 235/462.14 |
| 2008/0027817 A1 | 1/2008 | Iizaka et al. | |
| 2008/0298631 A1* | 12/2008 | Nishida | H04N 1/2166 382/100 |
| 2009/0016606 A1* | 1/2009 | Meyer | G06K 9/3283 382/176 |
| 2009/0265381 A1* | 10/2009 | Canu | G06Q 50/22 |
| 2010/0329537 A1* | 12/2010 | Gardi | G06K 9/6253 382/140 |
| 2012/0106787 A1* | 5/2012 | Nechiporenko | G06K 9/00 382/103 |
| 2014/0023270 A1* | 1/2014 | Baheti | G06K 9/4642 382/171 |
| 2014/0112526 A1 | 4/2014 | Kim et al. | |
| 2014/0211982 A1 | 7/2014 | Murphy et al. | |
| 2014/0214758 A1* | 7/2014 | Tripathi | G06F 16/93 707/608 |
| 2015/0178521 A1* | 6/2015 | Ching | G06K 5/00 235/375 |
| 2015/0294437 A1 | 10/2015 | Manno et al. | |
| 2016/0019529 A1 | 1/2016 | Wang et al. | |
| 2016/0267620 A1* | 9/2016 | Calhoon | G06T 1/0092 |
| 2016/0343065 A1* | 11/2016 | Chiba | G06Q 30/0601 |
| 2016/0350756 A1 | 12/2016 | Shepard et al. | |
| 2017/0017837 A1* | 1/2017 | King | G06F 16/5846 |
| 2017/0039885 A1* | 2/2017 | Flores | G09B 19/0092 |
| 2017/0180642 A1* | 6/2017 | Langlotz | H04N 5/23245 |
| 2019/0392936 A1* | 12/2019 | Arric | G16H 20/13 |

FOREIGN PATENT DOCUMENTS

| | | |
|---|---|---|
| CN | 103745188 A | 4/2014 |
| CN | 105431866 A | 3/2016 |
| JP | 2014-215965 A | 11/2014 |
| JP | 5783299 B2 | 9/2015 |

OTHER PUBLICATIONS

Office Action dated Aug. 13, 2020 in corresponding Chinese Patent Application No. 2018105942676, 21 pages (with translation).

* cited by examiner

| KEY PATTERN | FORMAT | RECOGNITION TARGET CHARACTER STRING |
|---|---|---|
| PROCESSING DATE | xx.xx.xx | 0~9 |
| EXPIRATION DATE | xx.xx.xx | 0~9 |
| (ALLERGENS ALLERGY) | | SHRIMP, CRAB, WHEAT, BUCKWHEAT EGG, MILK, PEANUT ABALONE, CUTTLEFISH, FISH EGG, BEEF, PORK, SESAME, SOYBEAN, ··· |
| | | CUSTOMER REGISTRATION INFORMATION<br>SHIITAKE, ENOKI |
| | | |

FIG.11

| | COMMODITY NAME | COMMODITY | UNIT PRICE | AMOUNT | |
|---|---|---|---|---|---|
| 1 | TUNA FOR SASHIMI | 1 | 612 | 612 | TAX-INCLUDED |
| 2 | POTATO CHIP | 1 | 108 | 108 | TAX-INCLUDED |
| | | | TOTAL | | 2 ITEMS 720 YEN |

TUNA FOR SASHIMI
    PROCESSING DATE 17.07.06
    EXPIRATION DATE  17.07.08

POTATO CHIP
    WHEAT, BEEF, SESAME, SOYBEAN, PORK, EGG, MILK, SHRIMP

FIG.12

```
     2017, JULY 7TH (FRIDAY) NO. 770

TUNA FOR SASHIMI              ¥612
  POTATO CHIP                   ¥108
  SUBTOTAL                      ¥720
  TOTAL                         ¥720
  DEPOSIT                       ¥1000
  CHANGE                        ¥280

ITEMS 2

THANK YOU VERY MUCH.
        WELCOME TO COME AGAIN.

TUNA FOR SASHIMI

PROCESSING DATE 17.07.06
       EXPIRATION DATE  17.07.08

POTATO CHIP

WHEAT, BEEF, SESAME, SOYBEAN,
       PORK, EGG, MILK, SHRIMP
```

DATA PROCESSING APPARATUS AND METHOD, AND NON-TRANSITORY COMPUTER READABLE MEDIUM

CROSS-REFERENCE TO RELATED APPLICATION

This application is based upon and claims the benefit of priority from Japanese Patent Application No. 2017-140645, filed Jul. 20, 2017, the entire contents of which are incorporated herein by reference.

FIELD

Embodiments described herein relate generally to a commodity data processing apparatus and method, and a non-transitory computer readable medium.

BACKGROUND

Generally, in a retail store which sells commodities, a commodity registration apparatus reads a barcode printed on the package of a commodity that a customer wants to purchase, and registers the commodity based on the commodity code indicated by the barcode. The commodity registration apparatus then retrieves the commodity master file stored in a database in which all commodity data is recorded and calculates the total price for checkout. In the checkout process, the commodity registration apparatus may display some useful information about the commodity purchased by the customer.

Such a conventional commodity registration apparatus requires a store worker to store the required information in the master file in association with an individual commodity code, leading to putting heavy burden on the retail store side. Moreover, such information displayed on the display is sometimes overlooked by the customer because of too much information available for the commodity.

Thus, there is need for a commodity registration apparatus that may display information about a commodity such that a customer can easily recognize only the useful information without requiring burdensome pre-registration process.

DESCRIPTION OF THE INVENTION

In accordance with an embodiment, a data processing apparatus comprises a memory configured to store a determination table, a camera configured to image a commodity package, and a processor. The processor is configured to extract an area having a predetermined shape from the imaged commodity package, recognize characters in the extracted area; determine whether the recognized characters meet a criterion described in the determination table, and output the recognized characters to a display or a printer connected to the data processing apparatus when the recognized characters meet the criterion.

Hereinafter, a plurality of embodiments will be described with reference to the accompanying drawings.

Figure 1:
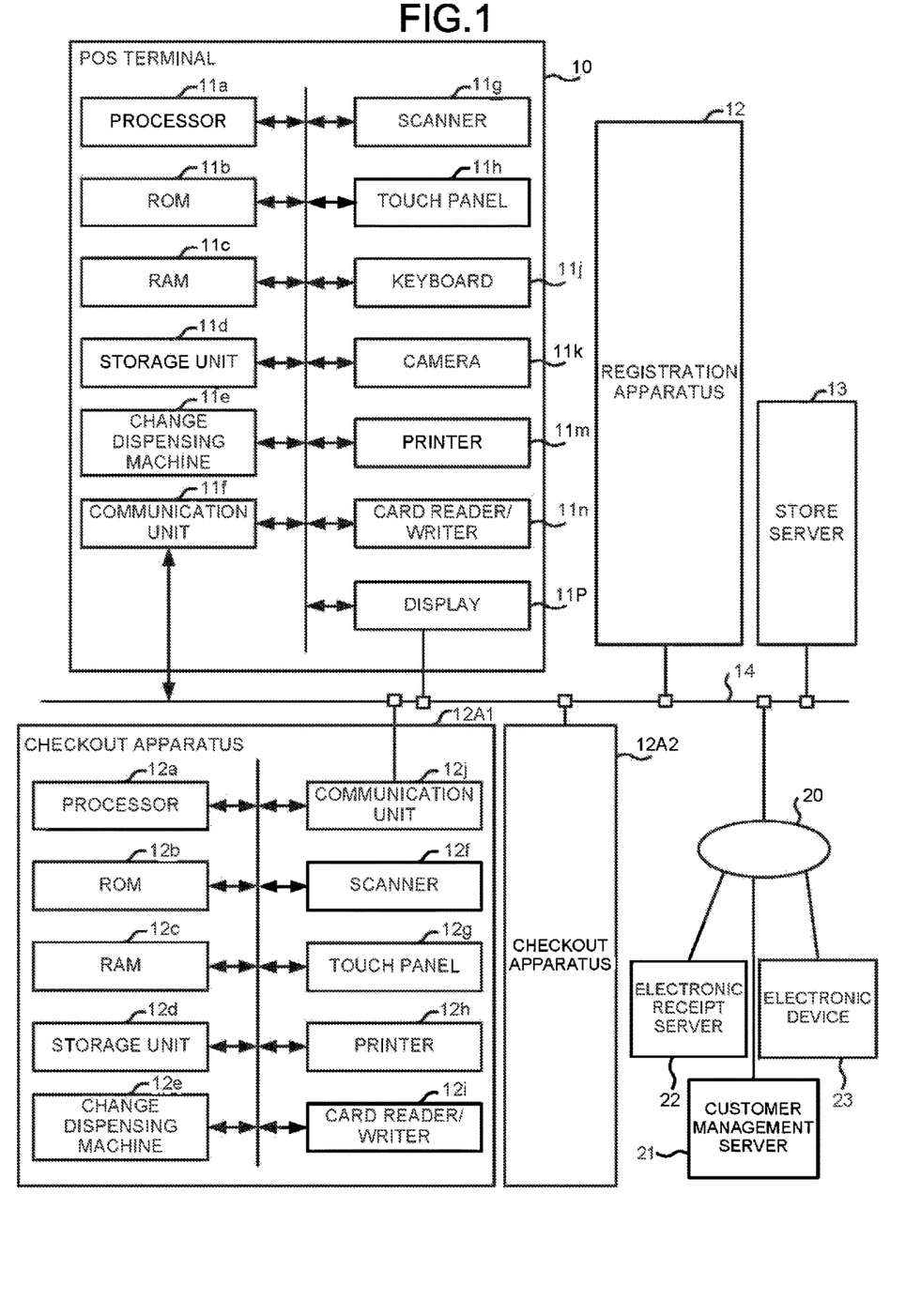
FIG. 1 is a block diagram illustrating a configuration of a checkout system according to an embodiment.

FIG. 1 is a block diagram illustrating a configuration of a checkout system according to an embodiment. The checkout system shown in FIG. 1 is installed in a retail store such as a supermarket. The checkout system includes a plurality of commodity data processing apparatuses (e.g., a POS (Point of Sales) terminal 10, a registration apparatus 12, and checkout apparatuses 12A1 and 12A2) for executing checkout process, and a store server 13.

The checkout system is connected to an external network 20 including the Internet, and can transmit and receive data to and from other devices such as a customer management server 21, an electronic receipt server 22, and an electronic device 23 through the network 20. The customer management server 21 stores data relating to a customer who is registered as a member and manages purchase of a commodity by the customer. The electronic receipt server 22 receives from the checkout system an electronic receipt obtained based on transaction data about commodities purchased by the customer, and manages the receipt for each customer. The electronic device 23, which is used by the customer, is a personal computer or a smartphone, for example. The electronic device 23 is used to access the customer management server 21 through the network 20 and to store unique information (such as customer registration information described later) for each customer. The electronic device 23 is used to access the electronic receipt server 22 through the network 20 to enable the customer to view an electronic receipt.

The checkout system shown in FIG. 1 includes the POS terminal 10 operated by a store clerk to perform registration and checkout of a commodity that a customer wants to purchase, the registration apparatus 12 operated by the store clerk to register the commodity, and plural checkout apparatuses 12A1 and 12A2 operated by the customer to perform a checkout process on the commodity registered by the registration apparatus 12. In an embodiment, the registration apparatus 12 and the checkout apparatuses 12A1 and 12A2 are included in a semi-self-type checkout system.

The checkout system may include a self-type checkout system with which a customer performs registration and checkout on a commodity the customer wants to purchase. The commodity data processing apparatus of the self-type checkout system is not shown as it has the same configuration as the POS terminal 10.

In a retail store, only the POS terminal 10 may be installed, or only one of the semi-self-type checkout system or the self-type checkout system may be installed, or both of them may be installed in a mixed manner.

FIG. 1 is a block diagram illustrating configurations of the POS terminal 10 and the checkout apparatus 12A1 according to an embodiment. The registration apparatus 12 has the same configuration as that of the POS terminal 10, and detailed description thereof is omitted. The checkout apparatus 12A2 has the same configuration as that of the checkout apparatus 12A1, and detailed description thereof is omitted.

The POS terminal 10, which has functions of a computer, includes a processor (Central Processing Unit (CPU)) 11a, a Read-Only Memory (ROM) 11b, a Random-Access Memory (RAM) 11c, a storage unit 11d, a change dispensing machine 11e, a communication unit 11f, a scanner 11g, a touch panel 11h, a keyboard 11j, a camera ilk, a printer 11m, a card reader/writer 11n, and a display 11p.

The processor 11a is a circuit for controlling each module to realize various operations by executing an operating system, middleware and application programs stored in the ROM 11b and the RAM 11c.

The ROM 11b and the RAM 11c record various programs executed by the processor 11a and data to be referred to when the processor 11a performs various processes. For example, the RAM 11c stores a commodity registration table in which information relating to a commodity to be purchased by the customer is registered when a process of registering information on the commodity is performed, image data obtained by photographing the commodity, character information obtained by performing a character recognition process on the image data, and a determination data table (refer to FIG. 10) to be referred to so as to determine whether the character information recognized by the character recognition process is valid as an output target.

The programs executed by the processor 11a include a control program for executing a process of inputting information (e. g., commodity code) of the commodity through the scanner 11g, a process of generating transaction information used in a checkout process based on the information about the commodity registered in the commodity registration table, a checkout process based on the transaction information, and the like. Furthermore, the programs executed by the processor 11a includes a commodity data processing program used to detect and output the character information determined to be valid through a purchase determination of the commodity by the customer from an image of a commodity package. The processor 11a executes the commodity data processing program to realize various functions including recognizing the character information by performing the character recognition process on the image obtained by photographing the commodity package, determining whether the character information is valid as the output target, and outputting the character information determined to be valid.

The storage unit 11d stores data used by the processor 11a to perform various processes or data generated by the process by the processor 11a. The storage unit 11d is, for example, a hard disk drive (HDD), a solid state drive (SSD), or the like.

The change dispensing machine 11e, which automatically deposits and dispenses cash in conjunction with the checkout process by the processor 11a, receives deposited coins and bills and discharges coins and bills as change.

The communication unit 11f communicates with the registration apparatus 12, the checkout apparatuses 12A1 and 12A2, the store server 13 and the like via a LAN 14, for example.

For example, the scanner 11g reads the commodity information by optical scanning and inputs a commodity code unique to the commodity attached with a barcode. The scanner 11g may be a fixed type barcode scanner or a handy type barcode scanner, or may be any type of scanner that identifies the commodity from an image obtained by photographing the commodity using an image recognition technology. Only one type of scanner 11g may be provided, or a plurality of types of scanners 11g may be provided.

The camera 11k photographs the commodity whose commodity code is read by the scanner 11g and outputs image data of the commodity package. The camera 11k is arranged, for example, at a position close to the scanner 11g. The camera ilk captures an image of the commodity package when the scanner 11g approaches the commodity to read the barcode of the commodity by the scanner 11g.

A plurality of cameras 11k may be provided so as to photograph not only a surface of the commodity package with the commodity barcode attached thereto but also surfaces of the commodity package containing other back surfaces and side surfaces. For example, a stand on which the commodity is placed is provided, and the bottom of the stand is made of a transparent member. The cameras 11k are provided at the bottom of the stand and above the stand to capture images of the commodity package of the back surfaces and front surfaces of the commodity placed on the stand. If the image of the commodity package can be acquired by the scanner 11g, the camera ilk can be omitted.

For example, the printer 11m is a thermal printer, an impact dot printer, or the like. The printer 11m prints various character strings, images, code patterns (e.g., a barcode, a two-dimensional code, etc.) and the like on a receipt paper by a receipt issuing process to issue a transaction receipt. The printer 11m may print the character information detected by the character recognition process on the image obtained by photographing the commodity package on the receipt paper in addition to the information indicating transaction contents such as a commodity name, a unit price, a total price, and the like. For example, the character information may be printed in a code pattern (e.g., a barcode, a two-dimensional code, etc.) indicating the character information in addition to being printed by printing a character string as it is.

The card reader/writer 11n reads data recorded on a card and writes data to the card. In addition to a card for checkout such as a credit card, a debit card, an electronic money card or a prepaid card, the card includes various cards for recording information relating to a checkout process such as a membership card and a point card. The card reader/writer 11n may be any of a magnetic type device, a contact type device, and a non-contact type device, or may include a plurality of types of devices.

The display 11p is used to provide a customer with information. For example, the display 11p is a well-known device such as a color LCD. In an embodiment, the display 11p displays character information detected by the character recognition process on the image obtained by photographing the commodity package as well as transaction information such as the commodity name, the unit price and the total amount.

In the case of the semi-self-type checkout system including the registration apparatus 12 and the checkout apparatuses 12A1 and 12A2, the registration apparatus 12 executes the character recognition process on the image of the commodity package to detect the character information, and transmits the character information together with the transaction information used for the checkout process to the checkout apparatus 12A1 or the checkout apparatus 12A2.

The checkout apparatus 12A1, which has functions of a computer, includes a processor 12a, a ROM 12b, a RAM 12c, a storage unit 12d, a change dispensing machine 12e, a communication unit 12j, a scanner 12f, a touch panel 12g, a printer 12h, and a card reader/writer 12i. The module of the checkout apparatus 12A1, which has the same name as that of the POS terminal 10, has the same function as that of the POS terminal 10, and a detailed description thereof is omitted.

The processor 12a executes a control program stored in the ROM 12b or the RAM 12c to execute the checkout process based on the transaction information generated by the registration process by the registration apparatus 12. Based on the commodity data processing program, the processor 12a can print the character information received from the registration apparatus 12 on the receipt paper in the same manner as the printer 11m of the POS terminal 10 described above. Based on the character information received from the registration apparatus 12, the processor 12a can display the character information together with the information relating to the transaction contents on the touch panel 12g, similarly to the display 11p of the POS terminal 10 described above.

In the semi-self-type checkout system, the checkout apparatuses 12A1 and 12A2 may execute the character recognition process on the image of the commodity package to output the character information with the touch panel 12g or the printer 12h. In this case, the scanner 12f photographs the commodity and inputs the image data of the commodity package.

The store server 13 manages the entire checkout system. The store server 13, which has the functions of a computer, includes a processor, a ROM, a RAM, a storage unit, a communication unit, a display, a keyboard, and a printer.

The store server 13 aggregates processes in the commodity data processing apparatuses including the POS terminal 10, the registration apparatus 12, the checkout apparatuses 12A1 and 12A2, and also provides data necessary for the processes in the commodity data processing apparatus. For example, the store server 13 can provide a determination data table for determining the character information that is valid as the output target among the characters printed on the commodity package. The details of this process will be discussed later referring to FIG. 10. The determination data table contains information common to different commodities, and the customer registration information unique to each customer. The customer registration information includes, for example, information indicating output target characters or character strings among the characters printed on the commodity package.

For example, the customer registration information may be registered in advance in the customer management server 21 by the customer in advance using the electronic device 23. The customer management server 21 stores the information indicating characters or character strings received through the electronic device 23 in association with member identification data (ID) unique to each customer.

If the member identification data is input by reading the membership card in the POS terminal 10 or the registration apparatus 12, the store server 13 inquires of the customer management server 21 about the customer registration information about the customer based on the member identification data. In response to the inquiry from the store server 13, the customer management server 21 transmits the customer registration information stored in association with the member identification data to the store server 13. The store server 13 stores the customer registration information received from the customer management server 21 and transmits it to the POS terminal 10 or the registration apparatus 12 to which the member identification data is input. In this way, the POS terminal 10 or the registration apparatus 12 can determine the validity of the recognized character information as the output target using the customer registration information corresponding to the customer.

In the above description, the POS terminal 10 or the registration apparatus 12 receives the customer registration information corresponding to the customer from the customer management server 21 via the store server 13. However, in an embodiment, the customer registration information may be input directly from the membership card or the electronic device 23 in which the customer registration information is recorded. The customer registration information corresponding to the customer may be registered to the store server 13 for each retail store from the electronic device 23 rather than the customer management server 21.

Next, the operation of the commodity data processing apparatus according to an embodiment is described. Here, the operation of the POS terminal 10 is described. FIG. 2, FIG. 3, FIG. 4, and FIG. 5 are flowcharts illustrating a control process by the POS terminal 10 (in particular, processor 11a) according to an embodiment.

Figure 2:
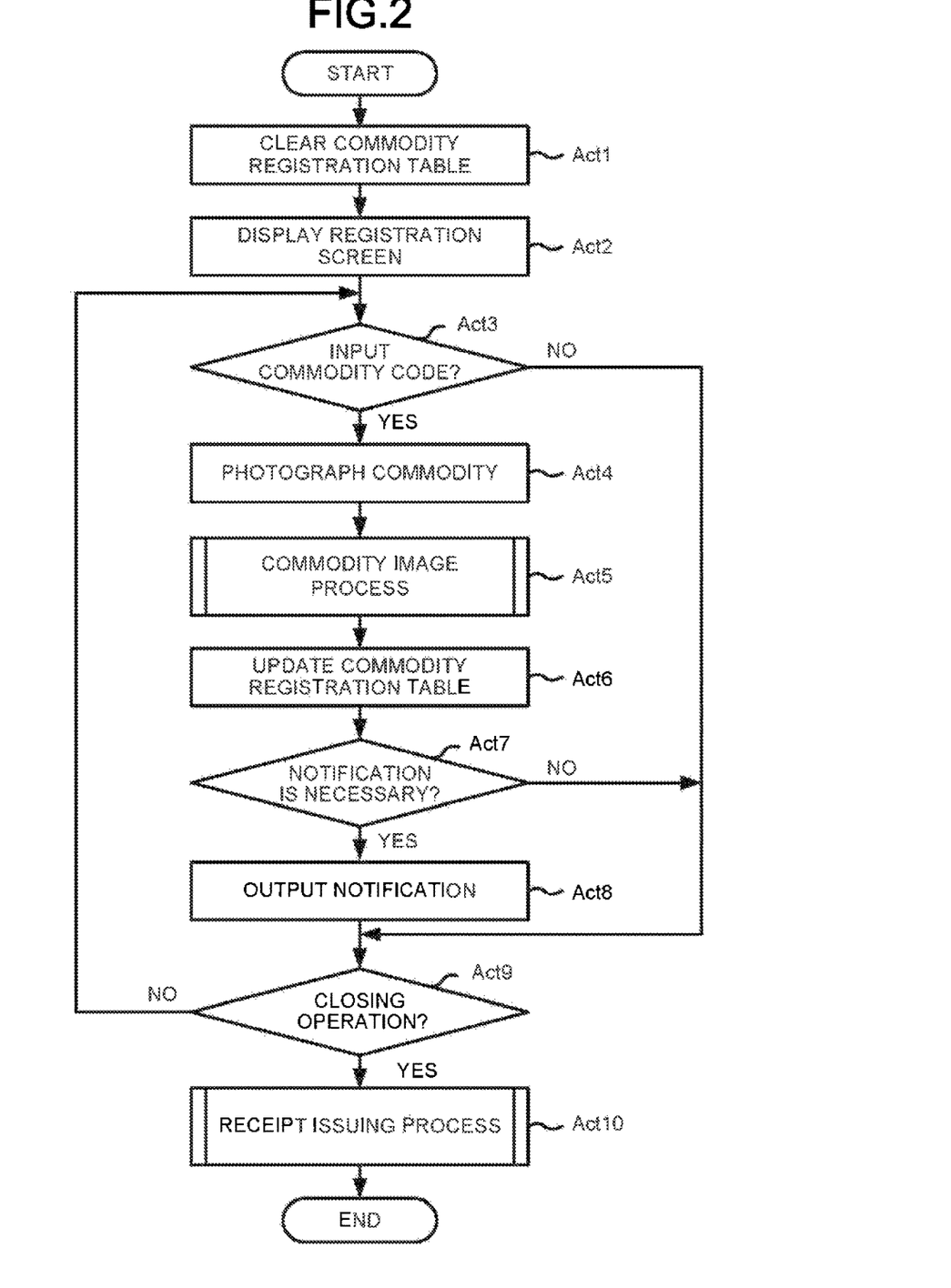
FIG. 2 is a flowchart for depicting a control process by a POS terminal according to an embodiment.

At the start of the control process, the processor 11a clears the registered contents of the commodity registration table recorded in the RAM 11c (Act 1). The processor 11a displays registration screens on the touch panel 11h and the display 11p (Act 2). The registration screens are used for displaying information about the commodity registered in the commodity registration table to enable the store clerk or the customer to confirm the progress of the registration process. The registration screens for the store clerk displayed on the touch panel 11h includes various function buttons such as a commodity button for the store clerk to designate a commodity, a subtotal button, and the like. The registration screen displays, for example, a commodity name, a quantity and unit price for the commodity registered in the commodity registration table, a total quantity, and a total price of the purchased commodities after registering the commodities.

In a state in which the registration screen is displayed, the processor 11a waits for a touch operation on the subtotal button displayed on the screen of the touch panel 11h and acquisition of the commodity code through the scanner 11f. If the commodity code is input (Yes in Act 3), the information relating to the commodity identified by the commodity code is read from the commodity master file and is then registered in the commodity registration table. The processor 11a enables the camera 11k to perform capturing and inputs the image data of the commodity whose commodity code is read (Act 4).

The processor 11a executes a commodity image process on the image data input by capturing by the camera 11k (Act 5).

Figure 3:
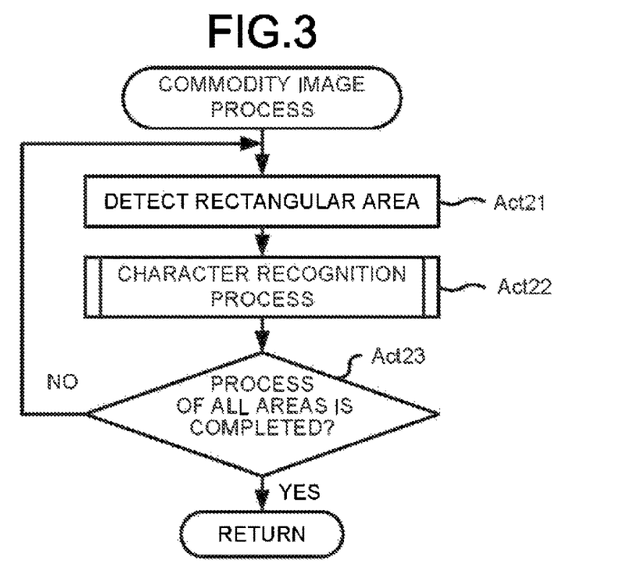
FIG. 3 is a flowchart for depicting a commodity image process according to an embodiment.

FIG. 3 is a flowchart for depicting the commodity image process according to an embodiment.

First, the processor 11a detects a rectangular area from which character information is extracted from the image obtained by photographing the commodity (Act 21). Specifically, the processor 11a detects a rectangular area on the image of the commodity package assuming that the characters to be recognized and potentially output are contained in that area.

Figure 6:
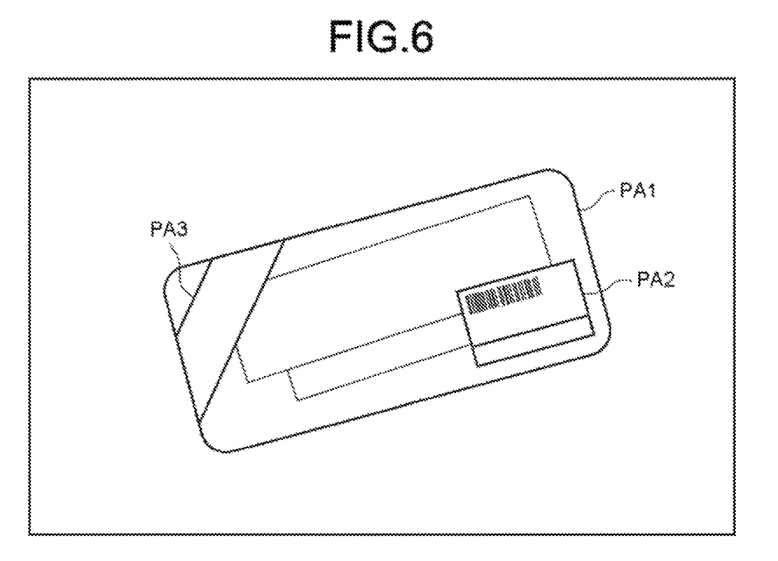
FIG. 6 is a diagram illustrating an example of an image obtained by photographing a commodity.

FIG. 6 is a diagram illustrating an example of the image obtained by photographing the commodity. FIG. 6 shows an example of the commodity package having a label "tuna for sashimi" on the tray. In the example of the image shown in FIG. 6, an area PA1 corresponding to an outer shape of the commodity tray, and an area PA2 corresponding to the commodity label attached to the commodity are detected as rectangular areas. In the example of the image shown in FIG. 6, an area PA3 corresponding to an advertisement label of the commodity is detected, but since the shape is not a rectangle, the area PA3 is excluded from a target area from which the character information is extracted.

In the system according to an embodiment, the rectangular area is not limited to an exact rectangular area. For example, the processor 11a may detect an area having substantially a rectangular shape.

Figure 7:
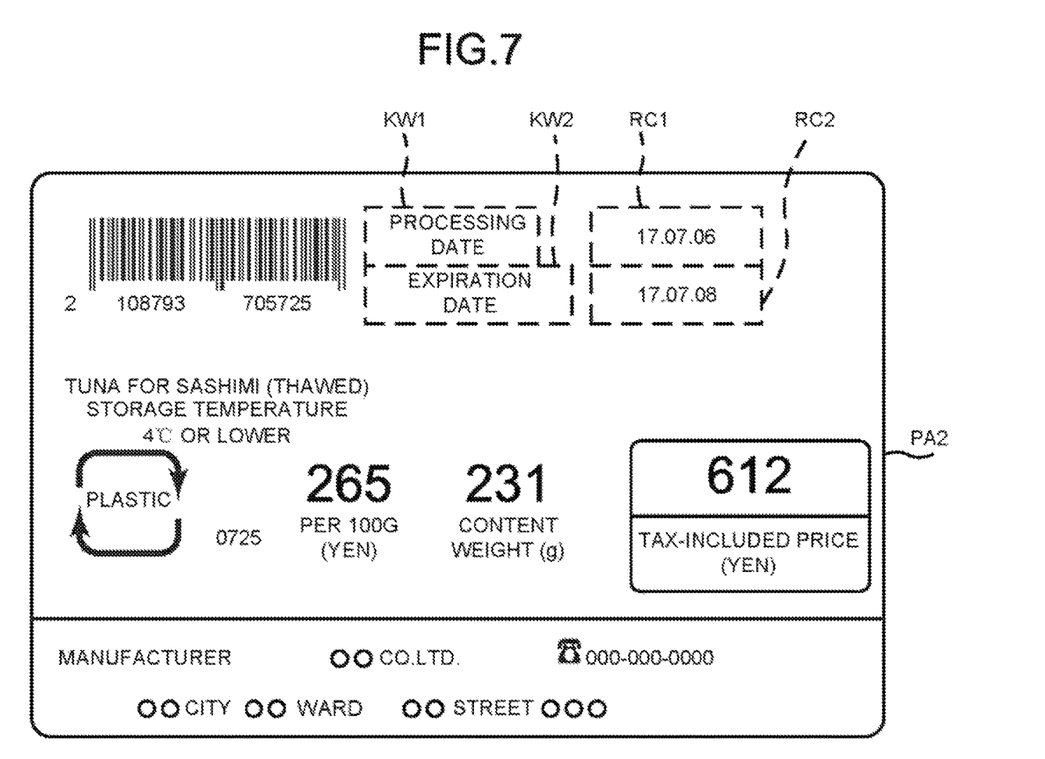
FIG. 7 is a diagram illustrating a detailed example of an image in an area PA2 detected from the image shown in FIG. 6.

FIG. 7 is a diagram illustrating a detailed example of the image of the area PA2 detected from the image shown in FIG. 6. As shown in FIG. 7, on the commodity label, a large amount of information relating to the commodity is described by characters.

Figure 8:
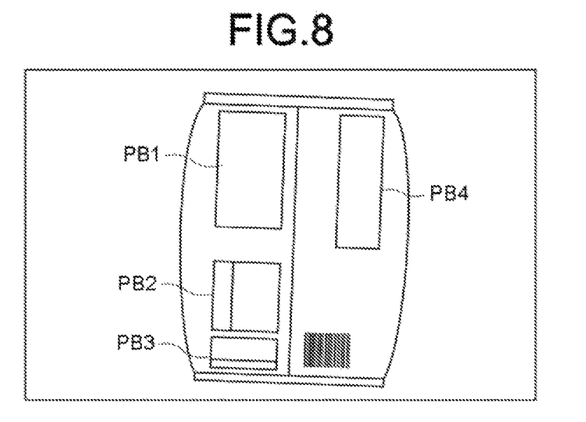
FIG. 8 is a diagram illustrating an example of an image obtained by photographing the commodity.

FIG. 8 is a diagram illustrating an example of an image obtained by photographing the commodity, which is different from the image shown in FIG. 6. FIG. 8 shows an example of a commodity manufactured by containing "potato chips" in a bag. In the example of the image shown in FIG. 8, plural areas PB1, PB2, PB3 and PB4 in which various kinds of information provided for customers are printed are detected on the surface where the bar code of the commodity is printed. The information printed on the commodity package includes information relating to the commodity for customers by the seller or manufacturer as well as information provided by law. In many cases, such information is printed in a rectangular frame to be clearly demonstrated to the customer.

Figure 9:
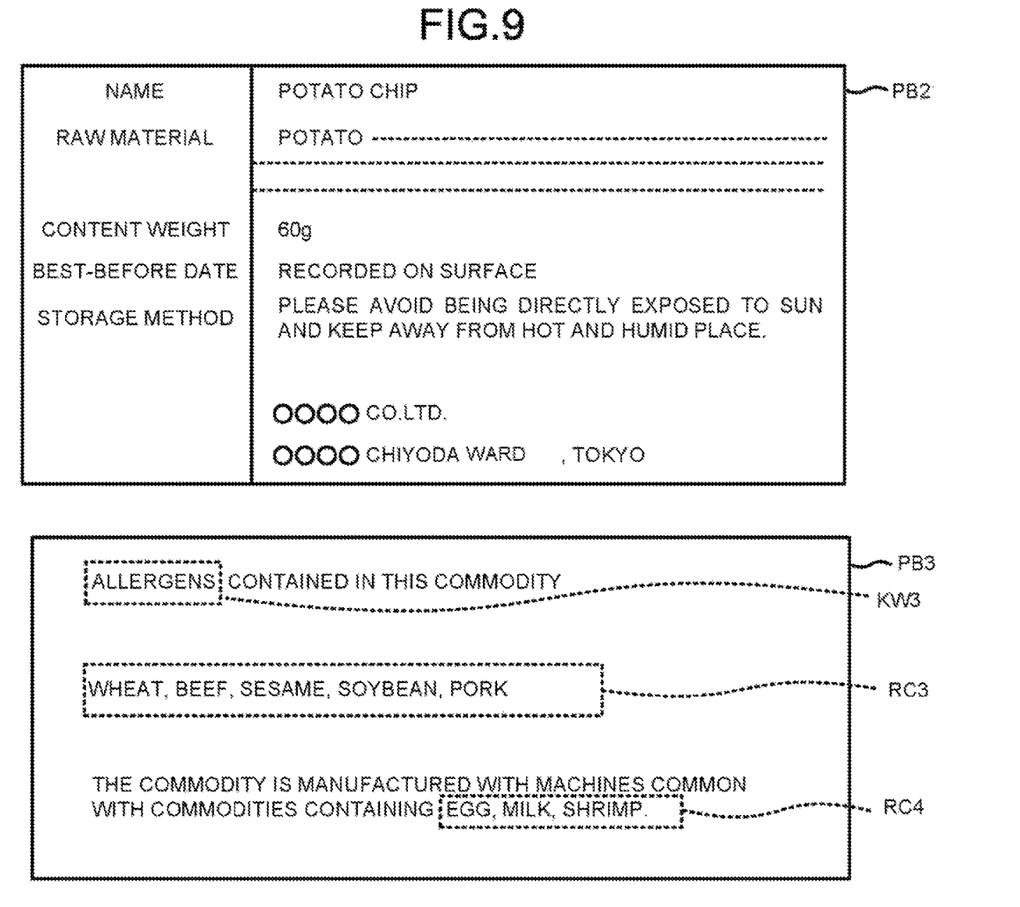
FIG. 9 is a diagram illustrating detailed examples of images in areas PB2 and PB3 detected from the image shown in FIG. 8.

FIG. 9 is a diagram illustrating detailed examples of images in the areas PB2 and PB3 detected from the image shown in FIG. 8. As shown in FIG. 9, the characters indicating, for example, a commodity name, a raw material name, a content weight, a best-before date, a storage method, a manufacturer, etc. are printed in the area PB2. Information on allergens (i.e., allergic substances) included in the commodity is printed in the area PB3.

The processor 11a executes the character recognition process on the image in the rectangular area detected from the image of the commodity to detect character information which is the output target (Act 22). With reference to the data set in the determination data table, the processor 11a performs the character recognition on the image in the rectangular area to extract the character information that is valid as the output target. The processor 11a repeats the process until the character recognition process is completed for the images of all the rectangular areas detected from the image of the commodity (Yes in Act 23).

Figure 10:
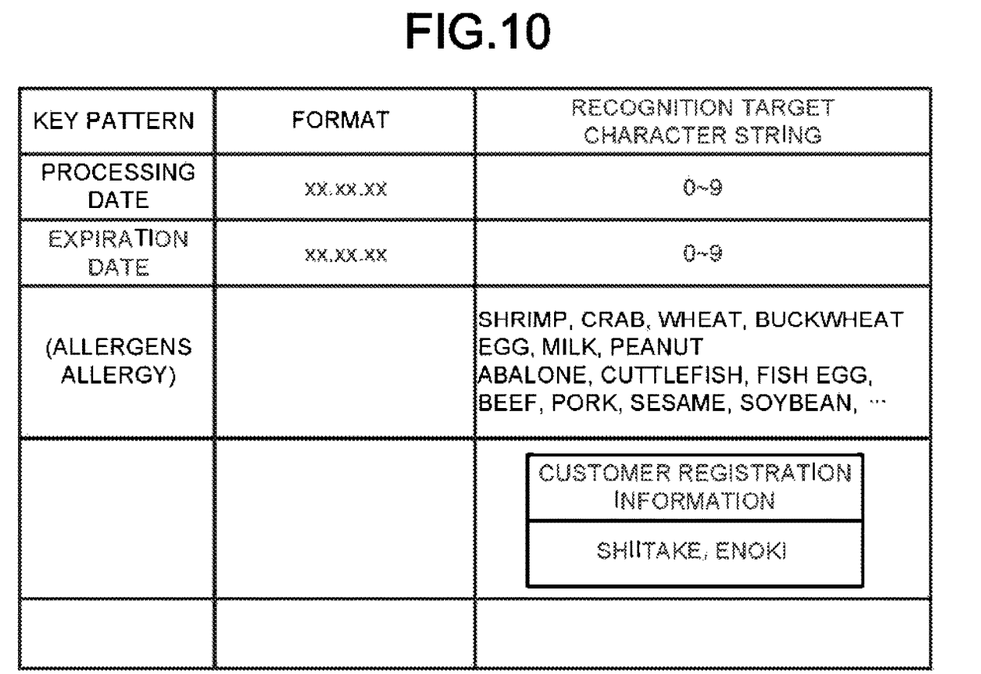
FIG. 10 is a diagram illustrating an example of data set in a determination data table according to an embodiment.

FIG. 10 shows an example of the data set in the determination data table according to an embodiment.

In the determination data table, data such as a key pattern, a format, and a recognition target character string is set. The key pattern is a reference for specifying a position where characters to be output are printed from the image in the rectangular area. For example, if the key pattern is detected from the image, the character information in the vicinity of the key pattern is extracted as the output target.

In the determination data table shown in FIG. 10, for example, "processing date" and "expiration date" are set as key patterns. A character in the vicinity of the key pattern "processing date", i.e., a character string corresponding to the recognition target character string "0 to 9" indicating date in a format set in the determination data table is extracted. The same is also applied to the "expiration date".

The vicinity of the key pattern can be defined for each key pattern. For example, in the case of the key pattern "processing date", a character string, which is within a preset distance from the position of the key pattern and is arranged along with the key pattern in parallel with the side of the rectangular area, is set as a recognition target. For the other key patterns, it is possible to simply determine the recognition target based on only a distance from the position of the key pattern.

The key pattern represents a template used for pattern matching, for example. An image pattern similar to the arrangement of the character string of the "processing date" or the "expiration date" can be extracted from the image in the rectangular area by pattern matching.

In the example shown in FIG. 10, the arrangement of the character string is set as the key pattern, but a figure, a logo pattern, a decorated character, and the like may be set as key patterns. The key pattern can be not only a template used for pattern matching but also a character string (e.g., keyword). If the keyword is set as the key pattern, it is determined whether there is a character string corresponding to the keyword in the character strings which are processing result of the character recognition. If there is a character string corresponding to the keyword, character information existing in the vicinity of the character string corresponding to the keyword is determined as the output target.

Furthermore, in the determination data table, characters or character strings representing allergens included in the food are set as the recognition target character string. The character information relating to allergens is important for many customers to make a decision to purchase the food product. Thus, in an embodiment, the characters related to allergens are set as the recognition target for all customers in advance. However, other characters or character strings not relating to allergens may be set as the recognition target character string.

Furthermore, in the determination data table, if the member identification data (ID) of the customer is input at the time of registering the commodity, the customer registration information corresponding to the member identification data received from the store server 13 is added. In the example shown in FIG. 10, the character strings "Shiitake" and "Enoki" mushrooms as the customer registration information are added as the recognition target character string. For example, when a customer does not want to purchase the commodity including "Shiitake" and "Enoki" as raw materials, "Shiitake" and "Enoki" are registered as the customer registration information in advance. Thus, when the character strings "Shiitake" and "Enoki" are printed on the commodity package, the character information can be output. By adding "Shiitake" and "Enoki" as the recognition target character string, not only the corresponding character string contained in the rectangular area in which the raw material name is described but also the corresponding character string contained in the rectangular area in which explanation of a recipe can be determined as the character information which is the output target.

In addition to setting the recognition target character string as the customer registration information, a keyword may be set as a key pattern in association with the recognition target character string. For example, by setting the keyword "raw material name" as the key pattern in association with the recognition target character string "Shiitake", the character string "Shiitake" printed in the vicinity of the character string "raw material name" is determined as the character information which is the output target, and the character string "Shiitake" included in the explanation of the recipe can be excluded from the output target.

In addition to adding the customer registration information to the determination data table via the electronic device 23, presence or absence of output of the character information and validity or invalidity of contents set in the determination data table in advance (e.g., key pattern, format, and recognition target character string), may be set in the determination data table. As a result, it is possible to detect the character information only when the presence of output of the character information is set in the character recognition process described later. Likewise, it is possible to control the output of the character information using only the information determined to be valid in the determination data table.

Figure 4:
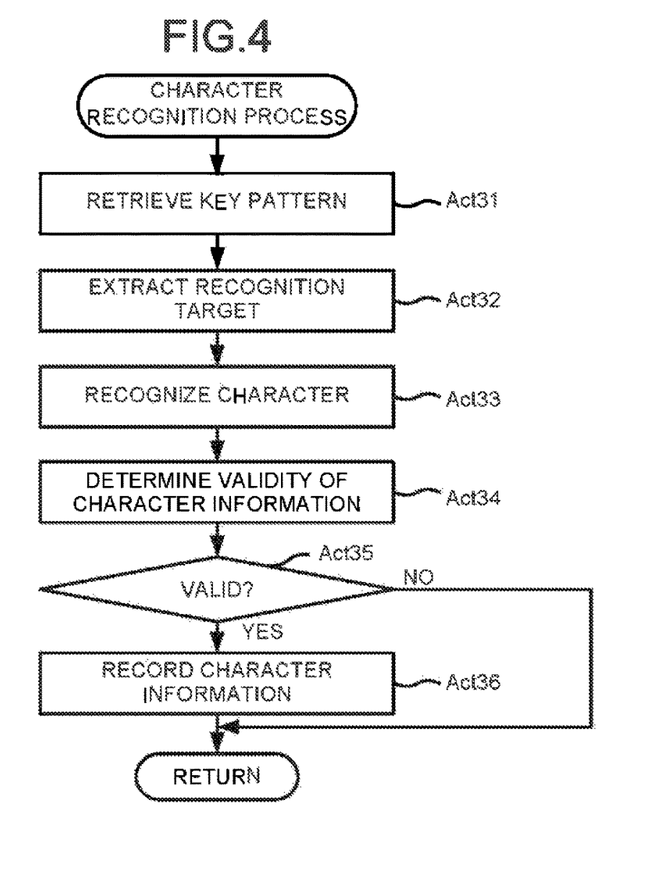
FIG. 4 is a flowchart for depicting a character recognition process according to an embodiment.

FIG. 4 is a flowchart for depicting the character recognition process according to an embodiment.

Based on the key pattern set in the determination data table, the processor 11a retrieves an image corresponding to the key pattern from the image in the rectangular area (Act 31). For example, in the case of the image shown in FIG. 7, image patterns KW1 and KW2 similar to the templates of the key patterns "processing date" and "expiration date" set in the determination data table are detected.

For the key patterns "processing date" and "expiration date", for example, character strings, which are within a preset distance from the position of the key patterns and are arranged along with the key pattern in parallel with the side of the rectangular area, are set as recognition target.

In this case, the processor 11a extracts, as the recognition target, image groups existing at positions respectively parallel to an upper side and a right side (or a left side) of the rectangular area with the position of the key pattern "processing date" as the reference (Act 32), and then executes the character recognition on the image groups (Act 33). In this case, an image group RC1 "17.07.06" existing at a position parallel to the upper side and an image group KW2 "expiration date" existing at a position parallel to the right side are extracted and the character recognition is executed for both.

The processor 11a determines whether the character data obtained by character recognition is valid as the character information which is the output target (Act 34). For the character extracted based on the key pattern, the format and recognition target character string are set in the determination data table. Therefore, the processor 11a determines the validity of the character information based on the format and the recognition target character string set in the determination data table.

For example, the character information "17.07.06" and "expiration date" is obtained by the character recognition based on the key pattern "processing date". In this case, the processor 11a can determine that the arrangement of the character "17.07.06" matches a format (e.g., xx.xx.xx) set in the determination data table and corresponds to character "0 to 9" set as the recognition target character string. Therefore, the processor 11a determines that the character "17.07.06" is valid as the character information which is the output target (Yes in Act 35). Regarding the format, it can also be determined that the arrangement of the character matches the format even if a part of them matches with each other in addition to a case in which they completely match with each other. The processor 11a records the character information determined to be valid as the output target in the RAM 11c or the storage unit 11d (Act 36). On the other hand, the processor 11a determines that the character information "expiration date" is not valid as it does not match the setting in the determination data table (No in Act 35).

For the key pattern "expiration date", the same process as described above is also executed. The processor 11a performs the character recognition on the image group RC2 "17.07.08" printed in the vicinity of the "expiration date", determines that the character information extracted by the character recognition is valid as the output target, and records the character information in the RAM 11c or the storage unit 11d.

The processor 11a extracts other image groups that do not correspond to the key pattern or the vicinity of the key pattern as the recognition target (Act 32) and executes the character recognition for all the image groups (Act 33). At this time, the processor 11a extracts image groups corresponding to characters arranged in parallel with the sides (i.e., upper and lower sides, left and right sides) of the rectangular area from the image in the rectangular area as the recognition targets, and then executes the character recognition process on these character strings. The character information that is useful for the customer to make a decision to purchase the commodity is printed on the commodity package in a clear form, and is generally written horizontally or vertically in a rectangular area. Therefore, by performing the character recognition process only for character strings arranged in parallel with the sides of the rectangular area, only the description which is valid as the output target is set as the target of the character recognition, and the description which is not valid as the output target such as the character information for advertisement of the commodity or a statement for decoration of the package can be excluded from the processing target.

In the case of the image in the rectangular area shown in FIG. 7, character strings indicating the name and the amount of the commodity, an address of the manufacturer, and the like are arranged in parallel with the sides of the rectangular area, and are extracted as the recognition target. As it is determined that the character information obtained by performing character recognition on these character strings does not match with the setting content selected in the determination data table (No in Act 35), the character information is determined to be invalid as the output target.

On the other hand, in the case of the image in the rectangular area shown in FIG. 9, since there is no key pattern, the extraction of the recognition target with the position of the key pattern as the reference is not executed. The processor 11a extracts the image groups corresponding to characters arranged parallel to the sides of the rectangular area from the image in the rectangular area as the recognition target, and performs the character recognition process on these character strings (Acts 32 and 33). As a result, the processor 11a determines that the character information obtained by performing the character recognition on image groups RC3 and RC4 included in an area PB3 corresponds to the character set as the recognition target character string in the determination data table. Since the character information "wheat" "beef" "sesame" "soybean" "pork" "egg" "milk" "shrimp" corresponds to characters set as the recognition target character string in the area PB3, the processor 11a determines that the character information described above is valid as the character information which is the output target (Yes in Act 35).

If the "allergens" are set as the key pattern for the recognition target character string corresponding to the allergens, the processor 11a can determine that only "wheat", "beef", "sesame", "soybean" and "pork" printed in the vicinity of the image group KW3 corresponding to the "allergens" are valid as the character information which is the output target. In other words, it is possible to exclude the character information "egg" "milk" and "shrimp" printed at a position distant from the image group KW3 corresponding to "allergens" from the output target.

Thus, if the character information which is the output target is detected from the image in the rectangular area by the commodity image process, the processor 11a records the character information which is the output target in association with the commodity registered in the commodity registration table (Act 6). The processor 11a displays the information such as the commodity name, price, or the like relating to the registered commodity on the touch panel 11h and the display 11p for the customer. At this time, if the character information which is the output target is extracted from the commodity package of the registered commodity, the processor 11a displays the character information together with the information relating to the commodity.

Furthermore, the processor 11a executes a check process based on the character information determined as the output target. In the check process, for example, necessity of change such as price registered in the commodity registration table, and necessity of notification such as a warning are determined.

For example, if the character information is extracted as the "expiration date", the processor 11a determines that a "discount" is necessary if the number of remaining days until the expiration date indicated by the character information is less than a preset number of days, and determines the sales of the commodity is "discontinued" if the expiration date is reached. The processor 11a executes a discount from the price registered in the commodity registration table, or deletes the registered commodity and then determines that a warning notification is necessary (Yes in Act 7). The processor 11a displays a change in the price or a warning message such as discontinuation of sales on the touch panel 11h and the display 11p for the customer (Act 8).

If the character information which is the output target extracted from the commodity package is information such as allergens which is important for purchase determination of the commodity, the processor 11a determines that the notification of warning is necessary (Yes in Act 7). The processor 11a displays the character information extracted from the commodity package on the display 11p to issue a warning to the customer (Act 8). In this way, the customer can request the store clerk to cancel the purchase of the corresponding commodity at this time point.

Thereafter, similarly, the processor 11a executes the above-described process for each of the commodities from which the commodity code is read.

Figure 11:
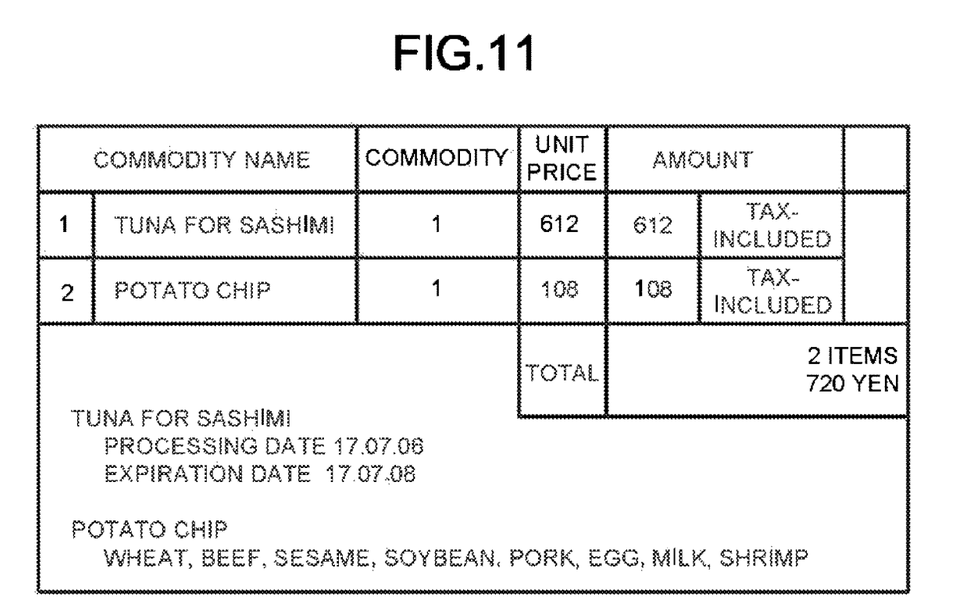
FIG. 11 is a diagram illustrating an example of a registration screen according to an embodiment.

FIG. 11 is a diagram illustrating an example of the registration screen according to an embodiment. As shown in FIG. 11, on the registration screen, the character information that is extracted from the commodity package and determined to be valid as the output target is displayed together with the information relating to the commodity such as the commodity name, the unit price, and the amount. In the above description, "17.07.06" and "17.07.08" are extracted as the character information from the commodity package of the commodity "tuna for sashimi". However, since the customer may not understand the meaning of the extracted character information itself, the commodity name "tuna for sashimi" of the target commodity and the character strings indicating the key patterns "processing date" and "expiration date" used for extracting the character information are added.

If the customer completes the registration of all the commodities that the customer wants to purchase and performs a closing operation (Yes in Act 9), the processor 11a executes a checkout process for the commodity registered in the commodity registration table, and executes a receipt issuing process.

Figure 5:
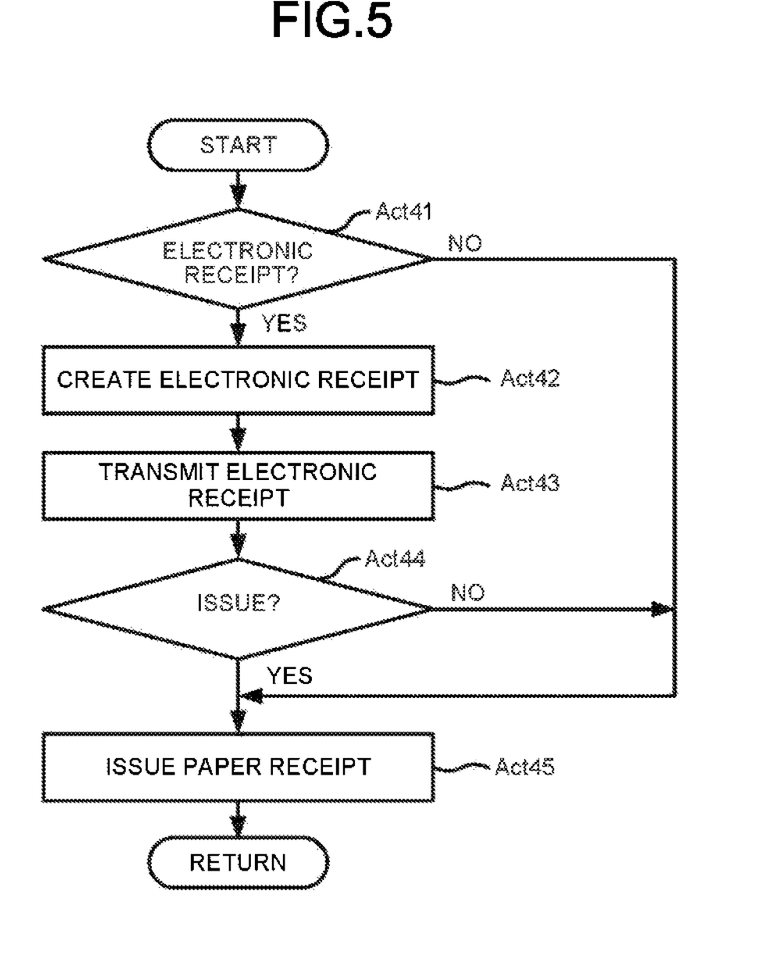
FIG. 5 is a flowchart for depicting a receipt issuing process according to an embodiment.

FIG. 5 is a flowchart for depicting the receipt issuing process according to an embodiment.

If the issuing of an electronic receipt is set (Yes in Act 41), the processor 11a creates electronic receipt data (Act 42). For example, the presence or absence of the issuance of the electronic receipt is associated with, for example, the member identification data.

The processor 11a creates electronic receipt data based on various data (e.g., receipt recording data) to be printed in a receipt included in the processing content subjected to the checkout process and the character information determined as the output target (Act 42). The character information extracted from the commodity package may be output in the form of character as it is, or may be converted to an image pattern such as a two-dimensional code to output, for example.

The processor 11a transmits the electronic receipt data to the electronic receipt server 22 via the store server 13 in association with the member identification data (Act 43). The electronic receipt server 22 stores the electronic receipt data which includes the character information and is received from the checkout system in association with the member identification data. Therefore, the customer can access the electronic receipt server 22 using the electronic device 23 to confirm the content of the electronic receipt including the character information.

On the other hand, the processor 11a displays a screen for confirming whether to issue a paper receipt on the display 11p. If there is an input indicating that the customer needs the paper receipt (Yes in Act 44), the processor 11a issues a receipt by the printer 11m based on various data (e.g., receipt recording data) to be printed on the receipt included in the processing content and the character information determined as the output target (Act 45).

Figure 12:
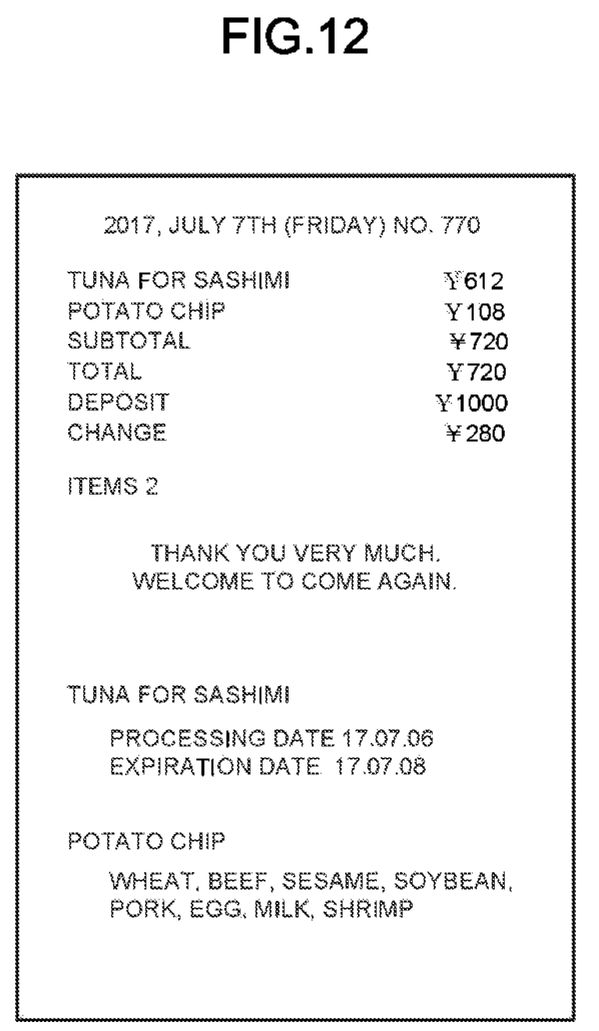
FIG. 12 is a diagram illustrating an example of a paper receipt according to an embodiment.

FIG. 12 is a diagram illustrating an example of the paper receipt according to an embodiment.

As shown in FIG. 12, on the paper receipt, the character information detected from the image of the commodity package is printed together with the content of the checkout process. As a result, the customer can easily recognize the character information detected from the purchased commodity based on the paper receipt. The character information may be printed on the paper receipt after being converted to an image pattern such as a two-dimensional code. In this case, the customer can read the character information by causing the electronic device 23 to read the two-dimensional code printed on the paper receipt with a camera or the like. The electronic device 23 can convert the two-dimensional code to the character information with a program stored in the electronic device 23 and display the character information on the display.

In the above description, as an output form of the character information, the character information is displayed with characters on the display, printed on the receipt paper (characters, and image pattern such as a two-dimensional code), and output as electronic receipt data; however, other output forms may also be used. For example, the character information may be output with a sound or may be output as an image corresponding to the character information cut out from the commodity package.

In this manner, in the commodity data processing apparatus (e.g., POS terminal 10) according to an embodiment, it is possible to extract the character information effective for the purchase determination of the commodity by the customer, such as deadline information such as the best-before date and the expiration date, information relating to the allergens, which are printed on the commodity package, from the image obtained by photographing the commodity to output the character information. As a result, the customer can determine the purchase of the commodity by referring to the output character information.

By executing the check process based on the character information, for example, based on the deadline information, it is possible to execute a process of not selling an expired commodity or a process of automatically reducing price of a commodity whose expiration date is close. It is possible to display a warning during the commodity registration process depending on the content of the character information. For example, by attaching a sticker on which the character information to be output is printed to the commodity package, it is possible to control the operation of the POS terminal 10 without changing the content of the commodity master file. For example, by attaching a sticker on which the expiration date has been changed, for example, a sticker "expiration date 17.07.07" to the commodity attached with the commodity label shown in FIG. 7, it is possible to determine a discount of the price of a commodity whose expiration date is changed to "17.07.07", or "discontinuation" of the sales of the commodity, or to determine necessity of a warning output.

Further, since the commodity data processing apparatus according to an embodiment extracts and outputs the character information printed on the commodity package, it is possible to simply output the character information effective for the purchase determination of the commodity by the customer without registering it in the commodity master file.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The programs for enabling a computer to execute the processes recorded in the above embodiment may be provided to various devices by being written in a recording medium such as a magnetic disk (a flexible disk or a hard disk), an optical disk (a CD-ROM or a DVD), a semiconductor memory or the like.

The programs may be transmitted via a communication medium to be provided to various devices. The computer reads the programs recorded on the recording medium or receives the programs via the communication medium and executes the programs to control the operation to execute the above processes.

What is claimed is:

1. A data processing apparatus, comprising:
a display;
a printer;
a memory that stores a pattern of characters representing commodify information about a commodity sold at a store;
a camera configured to image a commodity package; and
a processor configured to:
upon receipt of an image of a commodity package from the camera, determine whether an object having a rectangular shape is included in the image;
upon determining that an object having a rectangular shape is included in the image,
determine whether the object includes a first image of characters arranged parallel to one side of the object,
upon determining that the object includes the first image, extract the first image from the received image and recognize the characters included in the first image;
determine whether the recognized characters match the pattern stored in the memory; and
when the recognized characters match the pattern, output the recognized characters to either or both of the display and the printer.

2. The data processing apparatus according to claim 1, wherein
the recognized characters are output together with a label corresponding to the recognized characters.

3. The data processing apparatus according to claim 1, further comprising:
a scanner configured to scan a code printed on the commodity package, wherein
the code is scanned before the commodity package is imaged.

4. The data processing apparatus according to claim 3, wherein the processor is further configured to:
register the scanned code in the memory and calculate a payment amount, and
modify the payment amount based on whether the recognized characters indicate an expiration date that is a predetermined days after the current date.

5. The data processing apparatus according to claim 4, wherein the processor is further configured to, when the recognized characters indicate an expiration date that is prior to the current date, cancel the registration of the scanned code.

6. The data processing apparatus according to claim 1, wherein
the processor is configured to cause the printer to print the recognized characters on a receipt.

7. The data processing apparatus according to claim 1, wherein
the processor is configured to cause the display to display the recognized characters.

8. The data processing apparatus according to claim 1, wherein
the pattern of characters is defined for a single customer.

9. The data processing apparatus according to claim 1, wherein
the pattern of characters is defined for a plurality of customers.

10. The data processing apparatus according to claim 1, wherein
the recognized characters indicate an expiration date of a commodity, and
when the expiration date is reached, the processor is configured to output a warning to be displayed on the display.

11. The data processing apparatus according to claim 1, wherein
the pattern of characters is defined to detect characters representing an allergen contained in a commodity, and when the recognized characters match the pattern, the processor is configured to output a warning to be displayed on the display.

12. A method performed by a data processing apparatus including a memory, a display, and a printer, the method comprising:
    storing in the memory a pattern of characters representing commodity information about a commodity sold at a store;
    imaging a commodity package with a camera;
    determining whether an object having a rectangular shape is included in the image; and
    upon determining that an object having a rectangular shape is included in the image:
        determining whether the object includes a first image of characters arranged parallel to one side of the object,
        upon determining that the object includes the first image, extract the first image from the received image and recognizing the characters included in the first image;
        determining whether the recognized characters match the pattern stored in the memory; and
        when the recognized characters match the pattern, outputting the recognized characters to either or both of the display and the printer.

13. The method according to claim 12, wherein the recognized characters are output together with a label corresponding to the recognized characters.

14. The method according to claim 12, further comprising:
    scanning a code printed on the commodity package before the commodity package is imaged.

15. The data processing method according to claim 14, further comprising:
    registering the scanned code in the memory and calculating a payment amount; and
    modifying the payment amount based on whether the recognized characters indicate an expiration date that is a predetermined days after the current date.

16. The data processing method according to claim 15, further comprising:
    when the recognized characters indicate an expiration date that is prior to the current date, cancelling the registration of the scanned code.

17. The method according to claim 12, further comprising:
    printing the recognized characters on a receipt.

18. A non-transitory computer readable medium storing a program causing a computer to execute process comprising:
    storing in a memory a pattern of characters representing commodity information about a commodity sold at a store;
    imaging a commodity package with a camera;
    determining whether an object having a rectangular shape is included in the image; and
    upon determining that an object having a rectangular shape is included in the image:
        determining whether the object includes a first image of characters arranged parallel to one side of the object,
        upon determining that the object includes the first image, extract the first image from the received image and recognizing the characters included in the first image;
        determining whether the recognized characters match the pattern stored in the memory; and
        when the recognized characters match the pattern, outputting the recognized characters to either or both of a display and a printer.

19. The non-transitory computer readable medium according to claim 18, wherein the process further comprises:
    scanning a code printed on the commodity package before the commodity package is imaged,
    registering the scanned code in the memory and calculating a payment amount, and
    modifying the payment amount based on whether the recognized characters indicate an expiration date that is a predetermined days after the current date.

20. The non-transitory computer readable medium according to claim 19, wherein the process further comprises, when the recognized characters indicate an expiration date that is prior to the current date, cancelling the registration of the scanned code.

* * * * *